(12) United States Patent
Walch et al.

(10) Patent No.: US 7,707,338 B1
(45) Date of Patent: Apr. 27, 2010

(54) WWN TABLE MANAGEMENT SYSTEM AND METHOD

(75) Inventors: James A. Walch, Mission Viejo, CA (US); Leon A. Krantz, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 292 days.

(21) Appl. No.: 11/715,568

(22) Filed: Mar. 8, 2007

Related U.S. Application Data (60) Provisional application No. 60/789,836, filed on Apr. 6, 2006, provisional application No. 60/799,152, filed on May 10, 2006.

(51) Int. Cl.
*G06F 13/12* (2006.01)

(52) U.S. Cl. .............................. 710/74; 710/48; 710/52

(58) Field of Classification Search ....................... None
See application file for complete search history.

(56) References Cited

U.S. PATENT DOCUMENTS

| | | | | |
|---|---|---|---|---|
| 5,883,855 | A  * | 3/1999 | Fujita ...................... 365/238.5 |
| 6,343,324 | B1 * | 1/2002 | Hubis et al. .................. 709/229 |
| 7,337,277 | B2 * | 2/2008 | Benhase et al. ............. 711/135 |
| 2007/0192639 | A1 * | 8/2007 | Nichols et al. .............. 713/300 |
| 2008/0010427 | A1 * | 1/2008 | Kamano et al. ............. 711/163 |

* cited by examiner

*Primary Examiner*—Eron J Sorrell (57) ABSTRACT

A data storage controller includes a link module that selectively sets an interrupt. A control module is external to the link module that includes N buffers where N is an integer greater than 0. The controller allocates at least one of the N buffers to store world wide name ("WWN") table data in response to the interrupt. The controller also internally manages the WWN table data.

29 Claims, 9 Drawing Sheets

WWN TABLE MANAGEMENT SYSTEM AND METHOD

CROSS-REFERENCE TO RELATED APPLICATIONS

This application claims the benefit of U.S. Provisional Application No. 60/789,836, filed on Apr. 6, 2006 and U.S. Provisional Application No. 60/799,152, filed on May 10, 2006. The disclosures of the above applications are incorporated herein by reference in their entirety.

FIELD

The present disclosure relates generally to data storage controllers, and more particularly, to efficiently managing data flow in data storage controllers using a world wide name ("WWN") module.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Small Computer Systems Interface ("SCSI") includes a set of American National Standards Institute ("ANSI") standard electronic interface specifications. SCSI allows computers to communicate with peripheral devices, such as disk drives, tape drives, Compact Disc-Read Only Memory ("CD-ROM") drives, printers and scanners.

Serial Attached SCSI ("SAS") interfaces interconnect networks of storage devices with processing devices. SAS interfaces include storage devices that manage concurrent data transfer routines to one or more independent initiators. In general, initiators, which may be workstations or servers, determine the topology of devices in the network (e.g., discover other initiators, expanders and SAS interface modules). Once this information is known, initiators generally establish contacts with a SAS interface module. SAS storage devices manage a World Wide Name ("WWN") table that indexes initiator identification information for each independent initiator.

Figure 1:
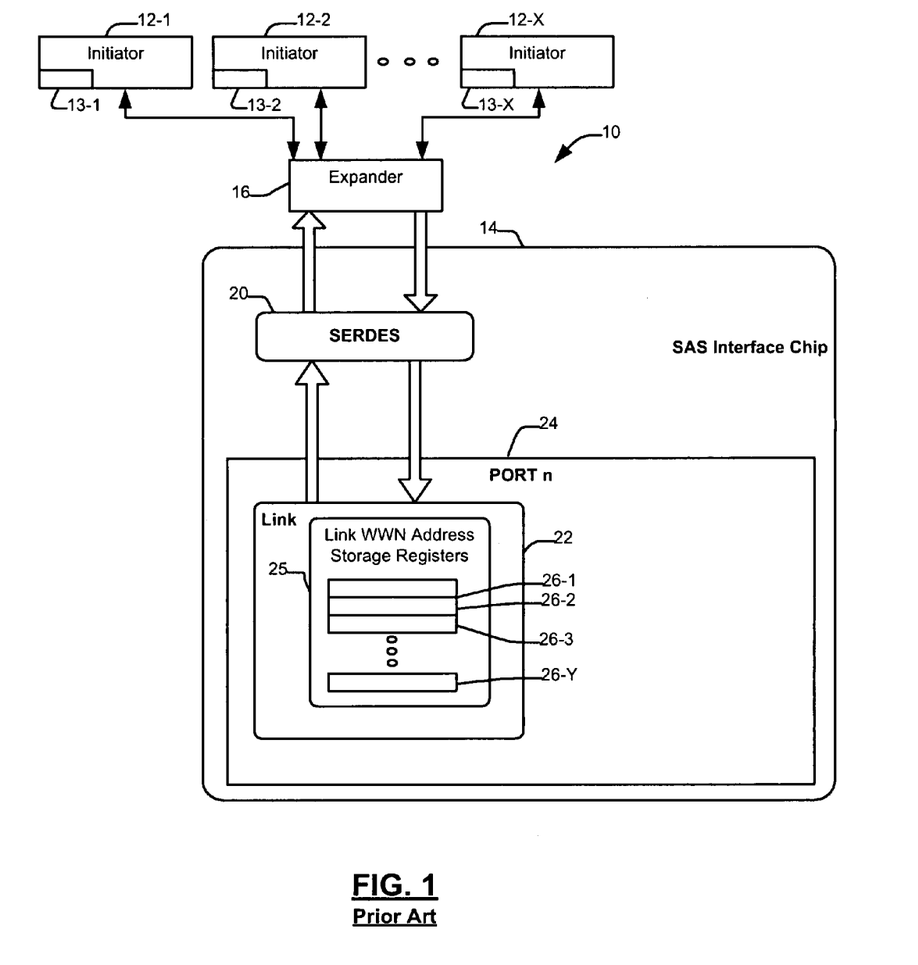
FIG. 1 is a functional block diagram of a network storage system according to the prior art.

Referring now to FIG. 1, a network system 10 may include one or more initiators 12-1, 12-2, . . . , 12-X (collectively initiators 12) each including initiator storage areas 13-1, 13-2, . . . , 13-X, which may be memory modules. The initiators 12 are connected to a SAS interface module 14 via an expander 16. The expander 16 may be an input/output control device that receives and routes data packets. One initiator 12-1 issues an "open" request (i.e., a SAS OPEN address frame) to establish a connection with an identified SAS interface module 14. Subsequently, either the initiator 12-1 or the SAS interface module 14 may re-establish connections.

A typical SAS interface module 14 includes a serializer/deserializer ("SERDES") 20 that converts serial data from the initiator 12 or expander 16 to parallel data and vice-versa. A link module 22 within a port 24 includes a table 25 of WWN address storage registers 26-1, 26-2, . . . , 26-Y managed directly by link hardware. The table 25 may have a fixed size that is limited. The link module 22 services initiator connection requests by storing and/or retrieving the source and/or destination WWN SAS address internally in registers. Since the amount of time the SAS interface module 14 takes to select and configure the link module hardware should be minimized, the link module 22 manages concurrent connection requests automatically for a limited number of WWN table entries, such as 8, 16 or 32. If the internal WWN table is full, the link module 22 rejects additional connection requests until space is available.

Figure 2:
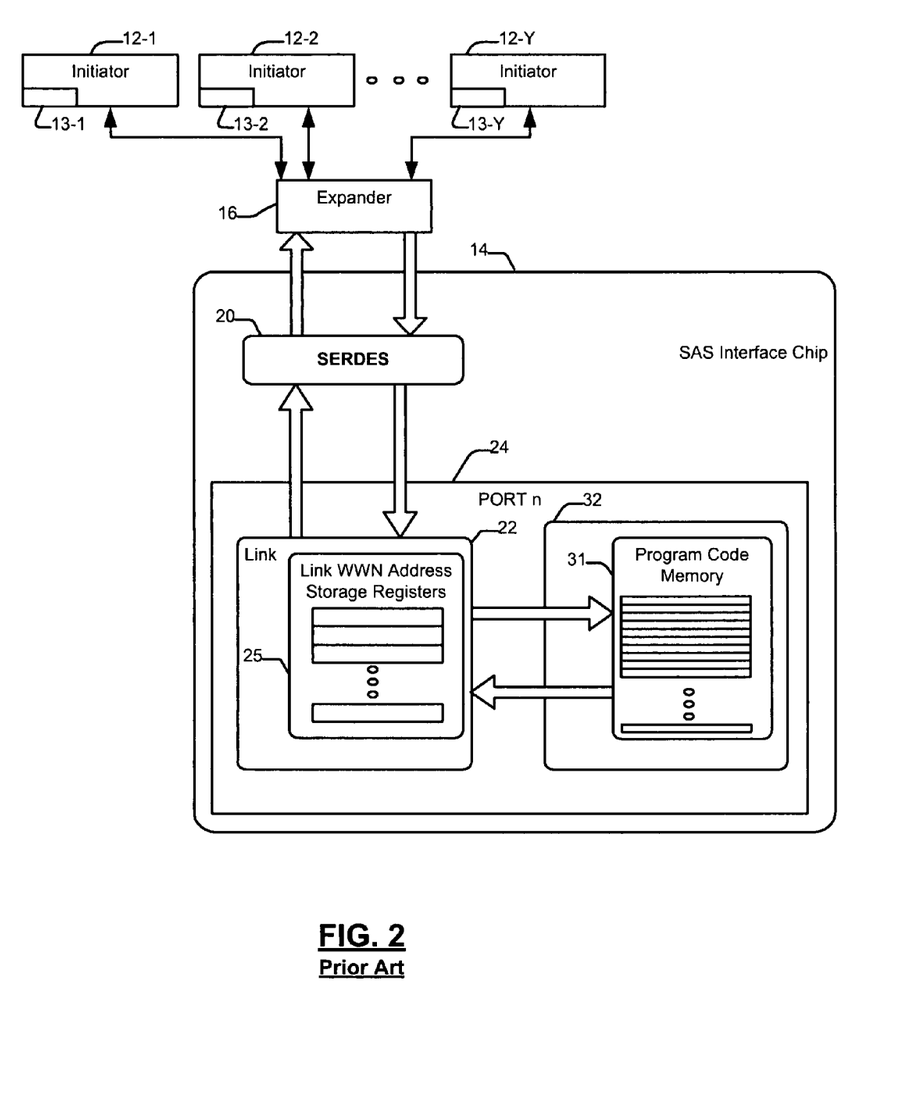
FIG. 2 is a functional block diagram of a network storage system according to the prior art.

Referring now to FIG. 2, if the internal WWN table is full, a link module 22 may allow additional entries to be managed or queued by a memory 31 within an external control module 32. The external control module 32 allocates memory space to store the additional entries and de-allocates the respective WWN entry in the link module 22. Managing of multiple WWN table locations slows connection request response time for the link module 22.

Further, the external control module 32 manually reads and resets link WWN table information. Since data in the link module registers dynamically changes, the link module is temporarily put into an idle state while the registers are being accessed.

SUMMARY

A data storage controller comprises a link module that selectively sets an interrupt. A control module is external to the link module that comprises N buffers where N is an integer greater than 0. The controller allocates at least one of the N buffers to store world wide name ("WWN") table data in response to the interrupt. The controller also internally manages the WWN table data.

In other features, the link module sets the interrupt when the link module receives one initiator connection request while servicing another initiator connection request. The link module comprises a WWN line register, an initiator connection tag ("ICT") line register, and an index register that store connection request data. The link module responds to changes in the index register by automatically triggering an interrupt service routine ("ISR") to configure the WWN line register and the ICT line register.

In other features, the data storage controller includes a buffer that stores data from the link module when the WWN table is full. The size of the WWN table is selectively definable. The data storage controller also includes a serializer/deserializer ("SERDES") that serializes data from the link module and deserializes data from devices external to the data storage controller. The SERDES deserializes data from the devices external to the data storage controller uninterrupted by the interrupt.

In other features, a network system comprises the data storage controller. A plurality of initiator modules communicate with the data storage controller. The plurality of initiator modules store WWN data in the N buffers. The control module configures the WWN data to allow the data storage controller to initiate a connection with one of the initiators. The network system comprises an expander that receives signals from the plurality of initiators and transmits a signal to the data storage controller. The data storage controller comprises at least one of a tape storage device, an optical storage device, a magnetic storage device, a magneto-optical storage device, and a robotic library storage device.

In other features, a method for storing data comprises selectively setting an interrupt in a link module. The method comprises allocating at least one of N buffers to store world wide name ("WWN") table data independent of the link module in response to the interrupt. N is an integer greater than 0.

The method also comprises internally managing the WWN table data in the N buffers external to the link module.

In other features, the method comprises setting the interrupt when the link module receives one initiator connection request while servicing another initiator connection request. The link module comprises a WWN line register, an initiator connection tag ("ICT") line register, and an index register that store connection request data. The method further comprises responding to changes in the index register by automatically triggering an interrupt service routine ("ISR") to configure the WWN line register and the ICT line register.

In other features, the method comprises storing data from the link module external to said WWN table and said link module when the WWN table is full. The method further comprises selectively defining size of the WWN table. The method further comprises serializing data from the link module and deserializing data from devices external to the data storage controller. Serializing data from the devices external to the data storage controller is uninterrupted by the interrupt.

In other features, a data storage controller comprises link means for linking that selectively sets an interrupt. Control means for controlling is external to the link means and comprises N storage means for storing data. N is an integer greater than 0. The control means allocates at least one of the N storage means to store world wide name ("WWN") table data in response to the interrupt. The control means internally manages the WWN table data.

In other features, the link means sets the interrupt when the link means receives one initiator connection request while servicing another initiator connection request. The link means comprises a WWN line register, an initiator connection tag ("ICT") line register, and an index register that store connection request data. The link means responds to changes in the index register by automatically triggering an interrupt service routine ("ISR") to configure the WWN line register and the ICT line register.

In other features, the data storage controller comprises a buffer means for storing data that stores data from the link means when the WWN table is full. Size of the WWN table is selectively definable. Means for arranging data serializes data from the link means and deserializes data from devices external to the data storage controller. The means for arranging data deserializes data from the devices external to the data storage controller uninterrupted by the interrupt.

In other features, a network system comprises the data storage controller. A plurality of initiating means for initiating communicate with the data storage controller. The plurality of initiating means store WWN data in the N storage means. The control means configures the WWN data to allow the data storage controller to initiate a connection with one of the initiating means. Means for expanding receives signals from the plurality of initiating means and transmits a signal to the data storage controller. The data storage controller comprises at least one of means for storing tape, means for storing optical data, means for storing magnetic data, means for storing magneto-optical data, and means for robotically storing data.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure includes systems and methods for dynamically managing connection requests in a data storage controller within a multiple initiator device environment. The data storage controller includes a data storage protocol layer, a physical link interface layer, and a control module dedicated to service the physical link interface layer. The data storage protocol layer may be a Small Computer Systems Interface ("SCSI"), a Serial Attached SCSI ("SAS"), or a Fibre Channel. The control module includes buffers having service routines driven by integrated interrupts. The control module dynamically translates and manages identification information from an initiator storage device to service connection requests to the data storage controller.

Figure 3:
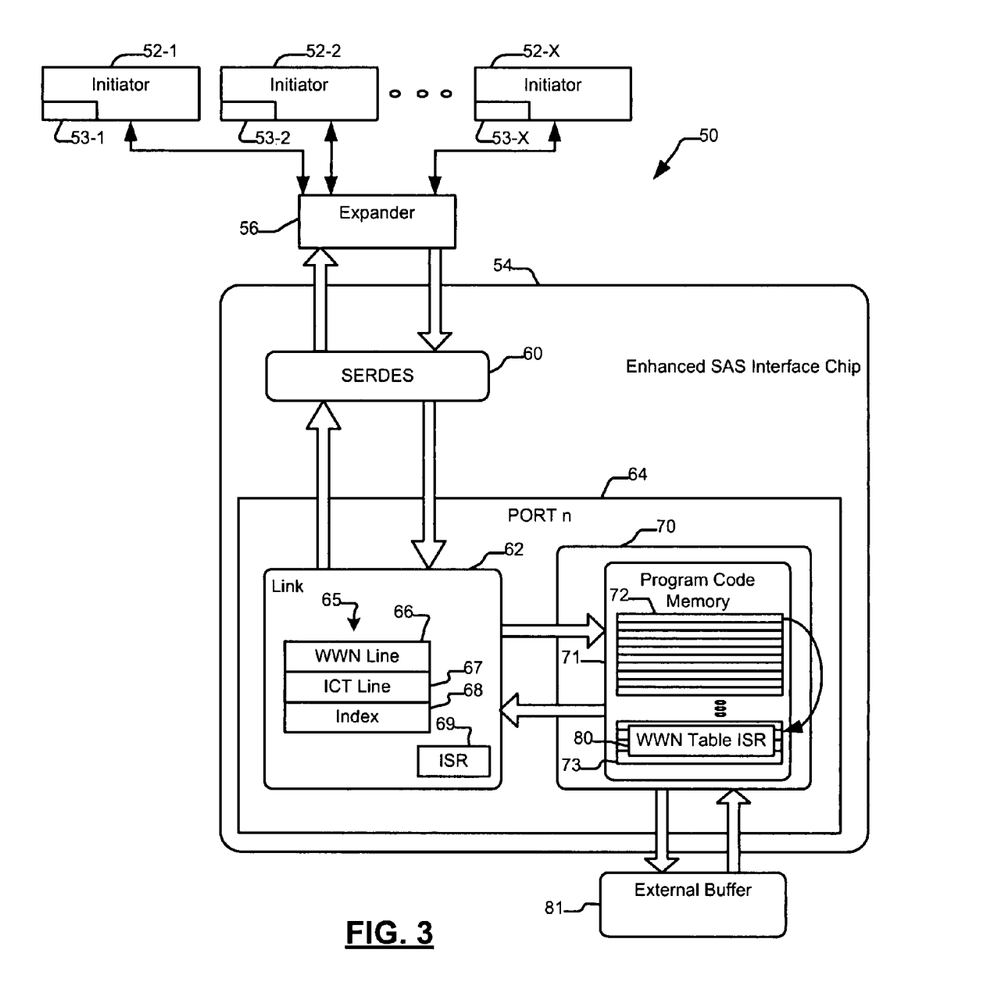
FIG. 3 is a functional block diagram of a network storage system according to the present disclosure.

Referring now to FIG. 3, a network system 50 includes one or more initiators 52-1, 52-2, . . . , 52-X (collectively initiators 52). Each initiator 52 includes a respective initiator storage area 53-1, 53-2, . . . , 53-X, which may be a memory module; and each initiator 52 is connected to a data storage controller (e.g. SAS interface module 54) via an expander 56. The SAS interface module 54 includes a serializer/deserializer ("SER- DES") 60 communicating with a physical link layer (PHY) module ("link module") 62 within a port 64. The link module 62 includes registers 65, such as a World Wide Name (WWN) line register 66, an initiator connection tag ("ICT") line register 67, and an index register 68. The registers 65 temporarily store WWN data from an initiator while the link module 62 processes the data. The link module 62 also services concurrent connection requests from initiators using an Interrupt Service Routine (ISR) module 69.

The port 64 includes a control module 70, such as a microcontroller, external to the link module 62 that includes a program code memory 71 having a plurality of buffers 72-1, 72-2, . . . 72-N (collectively referred to as buffers 72). The control module 70 writes a storage area within some or all of the buffers 72 to store WWN table data and may include, for example, 32-bit read/write access to program buffer addresses. The control module 70 may be selectively controllable, may have a length set for a WWN table 73, and may allocate a number of buffers to store the WWN table 73.

Each buffer 72 may include WWN table management service routines (e.g. WWN table management ISR 80) and may store WWN table entries as part of the WWN table 73. The ISR module 69 sets an interrupt that triggers a WWN table management ISR 80 to store and/or retrieve a source and/or destination WWN address. The interrupt from the link module 62 may be a WWN-to-index interrupt and/or an index-to-WWN interrupt.

If initiator WWN data does not match the data on the link registers 65, the link module 62 triggers the WWN-to-index interrupt to add the WWN information to a buffer, e.g. buffer 72-1. The number of entries that can be stored in the buffer 72-1 may be selectively defined. Once the WWN table entry has been serviced by the control module 70, the control module 70 assigns a WWN table index value and clears the WWN-to-index interrupt to indicate to the link module 62 that the WWN-to-index request has been serviced.

The control module 70 therefore stores and/or retrieves the source and/or destination WWN address internally-without requiring interruption of link module routines. As long as the WWN table index value is not zero (e.g. when the WWN table is not full), the link module 62 accepts an initiator "open" request.

If the WWN table 73 is full, the control module 70 may dynamically allocate more storage including utilizing additional (e.g. external) buffer resources 81, as required. The number of WWN table entries that can be managed may be selectively defined.

The control module 70 may respond to an index-to-WWN link module interrupt by using the index register 68 to configure and/or use the received initiator WWN data. The control module 70 may assign a persistent WWN table index for each initiator.

Figure 4A:
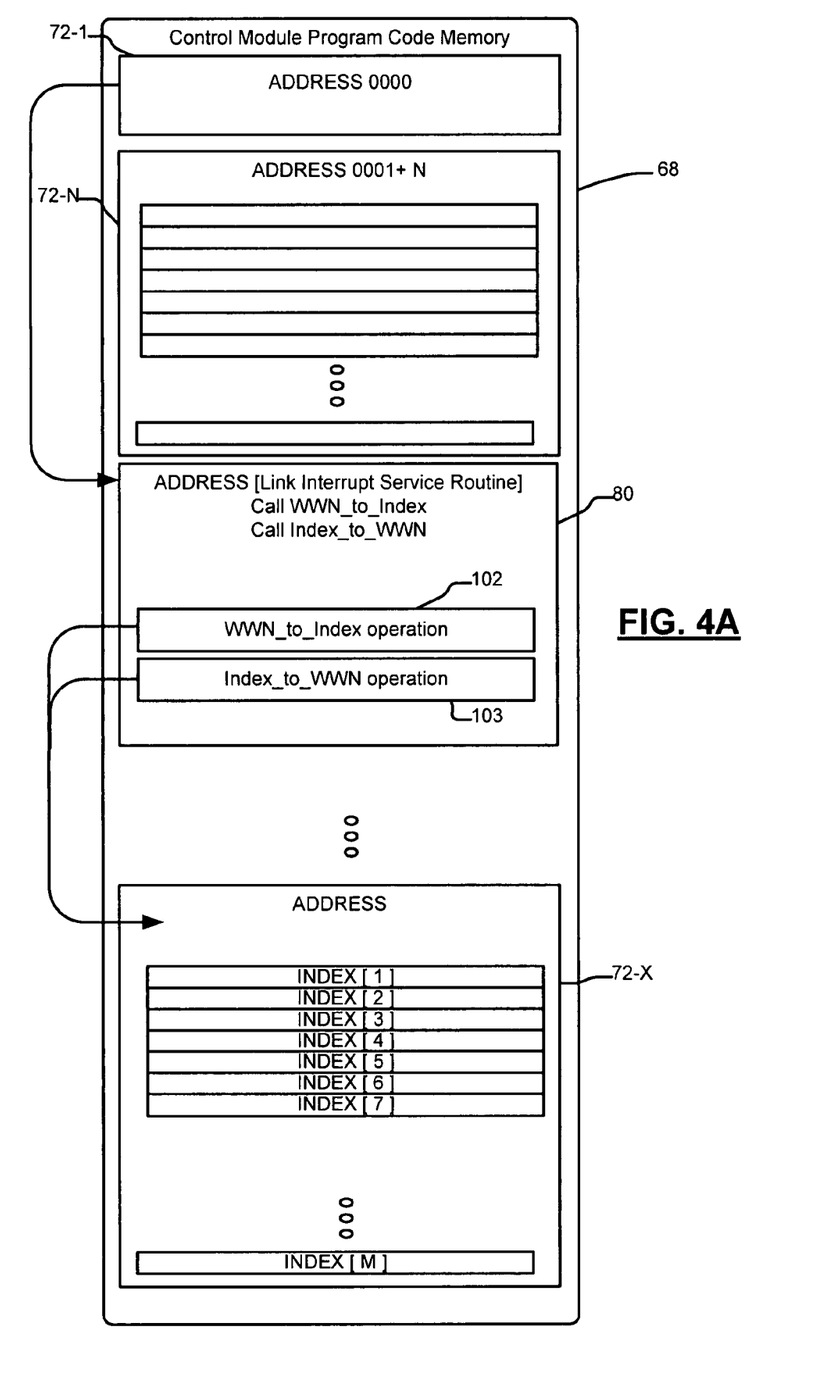
FIG. 4A is a functional block diagram of control module for a network storage system according to the present disclosure.

Referring now to FIG. 4A, buffer 72-1 receives a link module 62 interrupt. The WWN-to-index routine 102 requests access to the WWN table 73 for the entry. The control module 70 searches the table 73 for the entry. If the entry already exists, the WWN table management ISR 80 sets the link index register 68 to the index value. If the entry does not exist, the WWN table management ISR 80 assigns a new index to the entry, saves the entry, and saves a SAS hash address calculated from the WWN entry. The SAS hash address can be retrieved by the control module 70 using a hash index request.

An index-to-WWN routine 103 of the WWN table management ISR 80 sets the link module index register 68 and requests the corresponding WWN entry to be updated in the link module WWN line register 66. The WWN table management ISR 80 searches the WWN table 73 to locate and update the selected index provided in the link index register. If the selected index is not found, the WWN table management ISR 80 may set the index register 68 to zero to indicate to the link module 62 that the request failed.

The WWN table management ISR 80 reads buffer addresses (set by the control module 70) to service a specific WWN table management routine. The link module and control module interrupts may be disabled until the request is serviced.

Figure 4B:
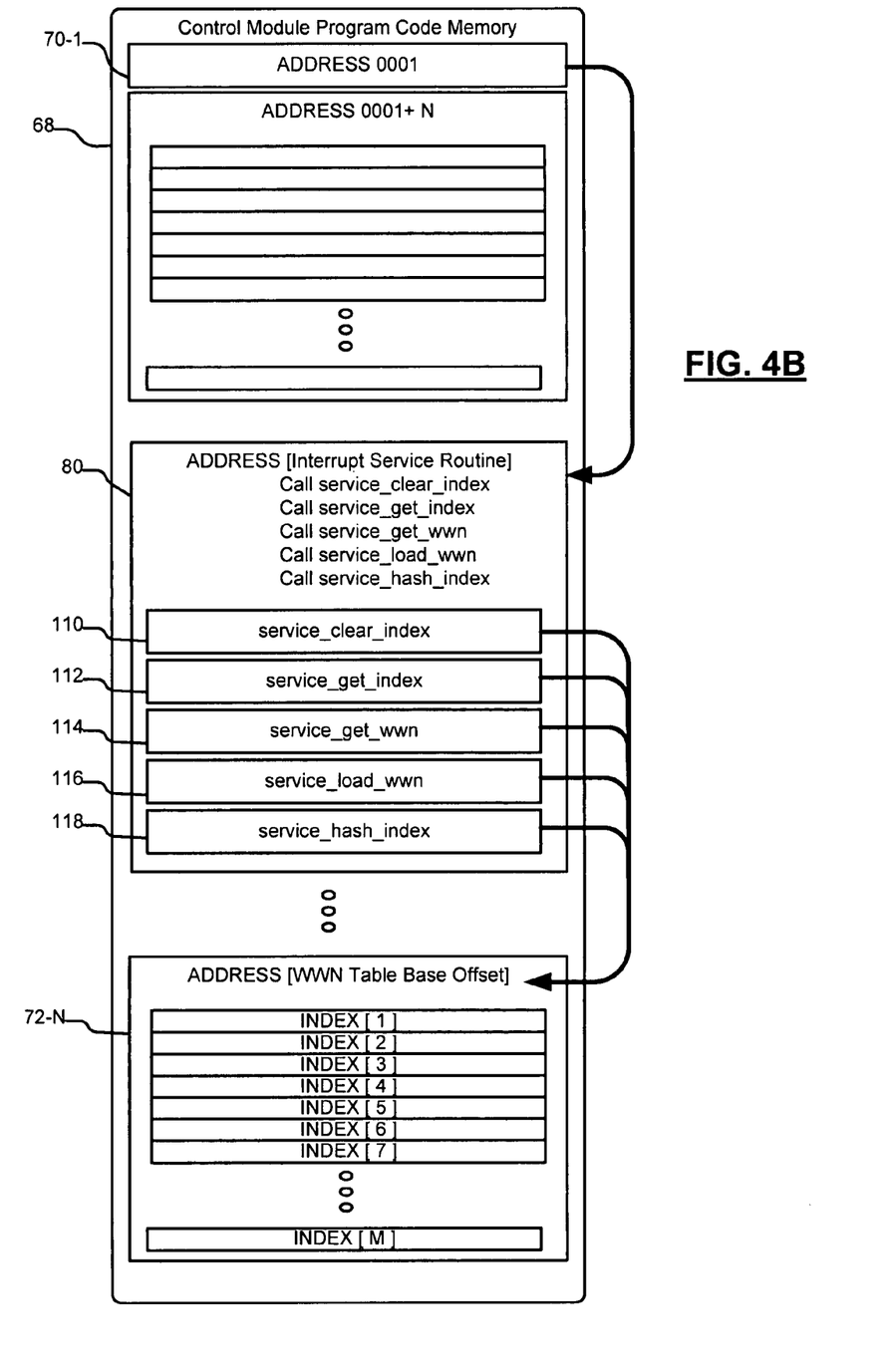
FIG. 4B is a functional block diagram of control module for a network storage system according to the present disclosure.

Referring now to FIG. 4B, the control module 70 may set a value in mailbox registers (not shown) that the program code memory 71 reads to service a specific WWN table management routine. For a "service clear index" routine 110, the WWN table management ISR 80 reads a mailbox register with the selected index and clears a valid bit in the corresponding WWN entry. The table management ISR 80 reads mailbox registers with the selected WWN and executes the WWN-to-index routine 102 using the given WWN entry through a "service get index" routine 112. The table management ISR 80 reads a set of mailbox registers with the selected index (through, e.g. a "service get WWN" routine 114) and executes the index-to-WWN routine 102. The table management ISR 80 reads mailbox registers with the selected WWN index (through e.g., "service load WWN" routine 116) and updates the selected index, e.g. any one of index 1, index 2, . . . , index M with the WWN entry.

The table management ISR 80 reads a set of mailbox routines with the selected index and retrieves the saved SAS hash address (through e.g., a "service hash index" routine 118) and writes this back to the mailbox registers. When "service clear index" routines 110, "service get index" routines 112, "service get WWN" routines 114, "service load WWN" routines 116, and "service hash index" routines 118 are completed, the table management ISR 80 clears the control module interrupt.

The present disclosure simplifies management of initiator WWN information by indexing. A WWN is typically 8 hex bytes in length and an initiator connection tag ("ICT") may be 2 hex bytes in length. Keeping track of additional information specific to each initiator may also be required or desired. An indexed table of WWN information may simplify management by, for example, device firmware and may allow a transfer request to a specific initiator WWN to be selected using an indexed value. The indexed value may be 1 hex byte in length, which allows up to 255 initiators to be managed. An index value of 0 may mean the current link module WWN information is not valid.

Figure 5A:
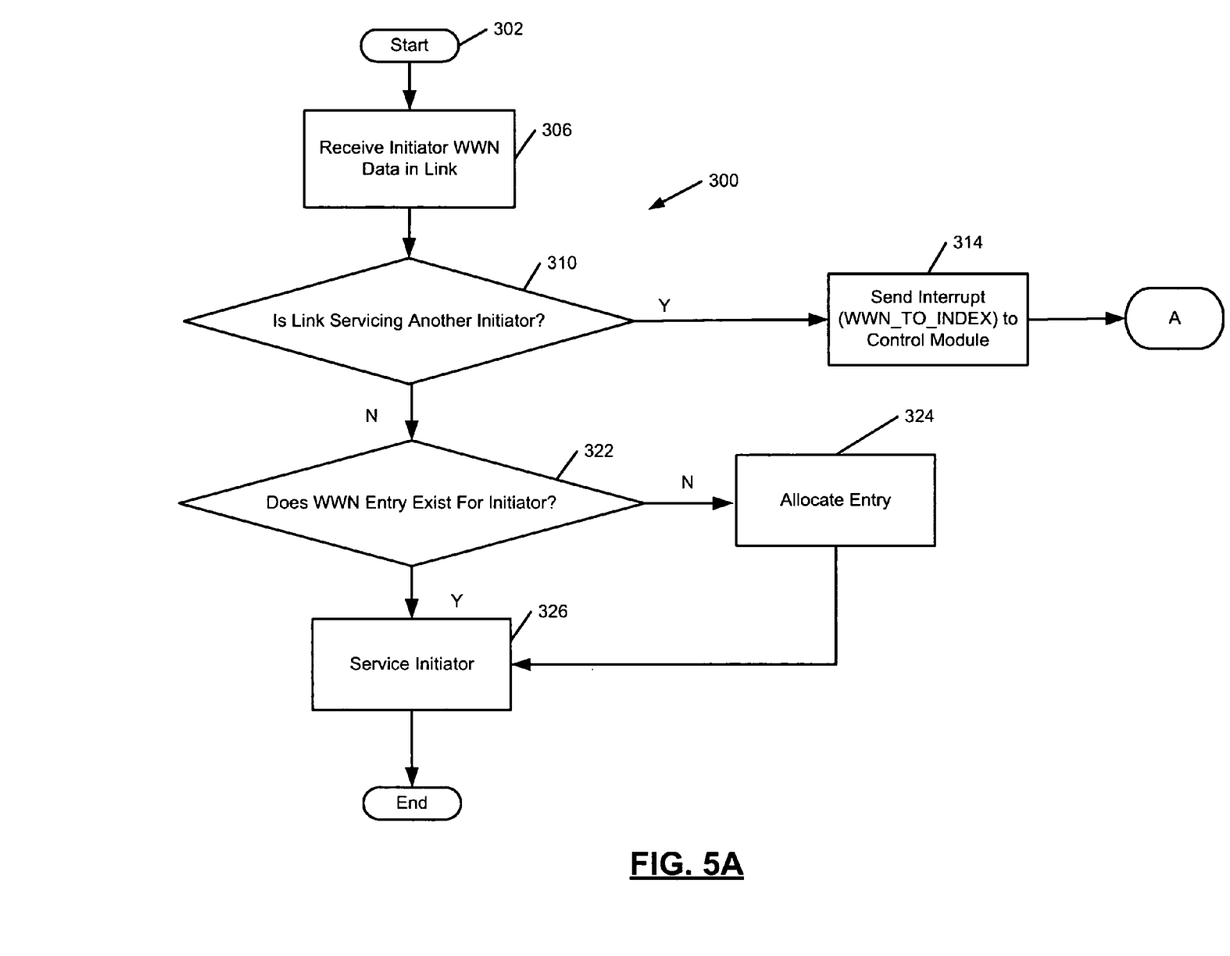
FIG. 5A is a partial flow diagram illustrating a method for storing World Wide Name ("WWN") information.
Figure 5B:
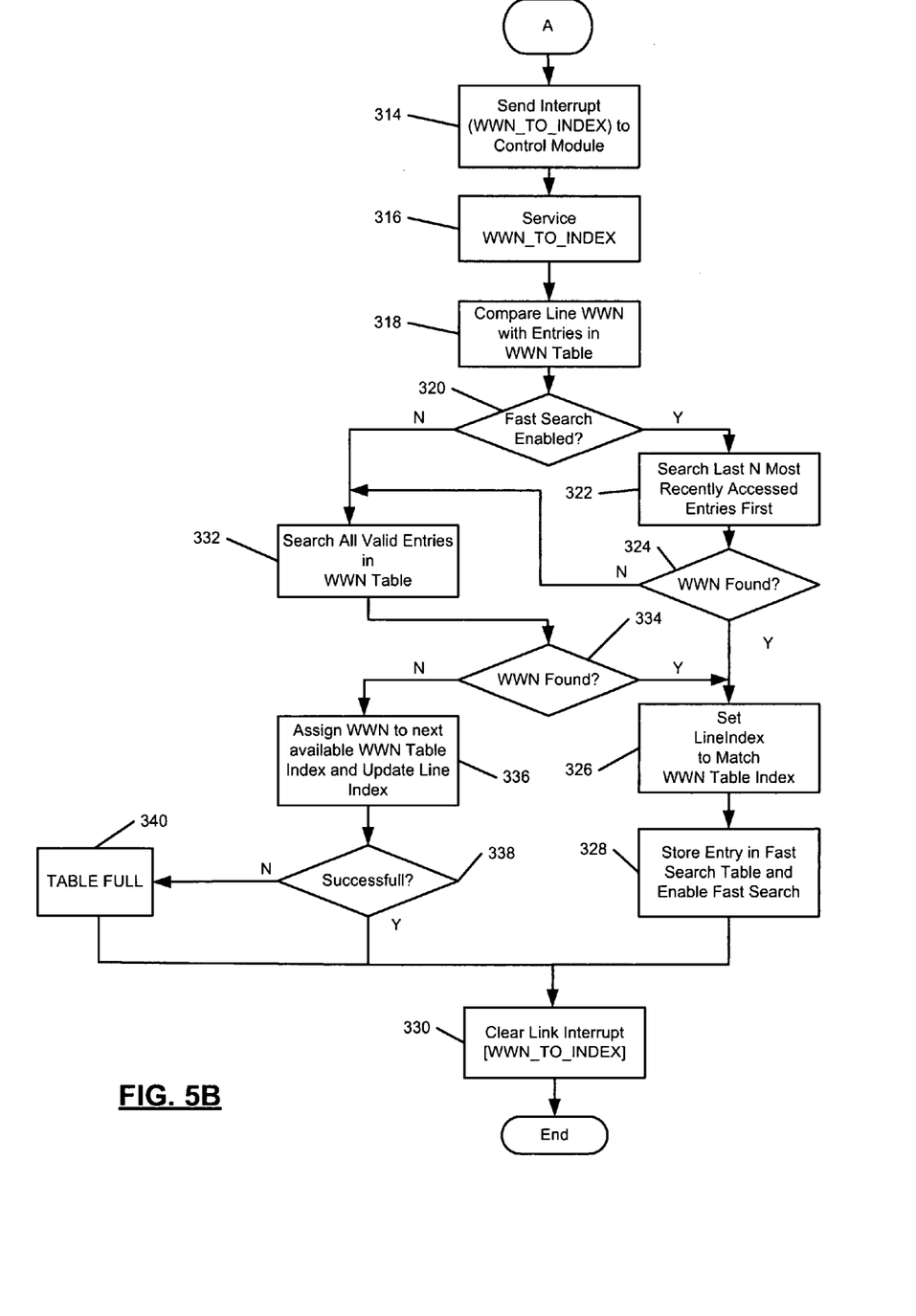
FIG. 5B is a partial flow diagram illustrating a method for storing World Wide Name ("WWN") information.

Referring now to FIGS. 5A and 5B, a method 300 for managing a WWN table is illustrated. The method 300 starts in step 302. In step 306, the link module receives WWN data from an initiator. In step 310, if the link module is servicing another initiator, the link module sends an interrupt to the control module in step 314. In step 316, the interrupt activates a control module buffer routine. In step 318, the link line register is compared with entries in the WWN table.

In step 320, if a fast WWN table search is enabled, most recently accessed entries are searched first in step 322. In step 324, if the WWN entry is found, a line index is set to match the WWN table index in step 326. In step 328 the entry is stored in the WWN table, e.g. a fast search table within the WWN table, and the fast search is enabled. In step 330, the link interrupt is cleared.

If steps 320 and 324 are false, all valid entries in the WWN table are searched in step 332. In step 334, if the WWN entry is found, control activates step 326. If step 334 is false, a WWN is assigned to the next available WWN table index and the line index is updated in step 336. In step 338, if step 336 is unsuccessful, the WWN table is full and the index is set to zero in step 340. If step 338 is false, control implements step 330.

In step 322, the link or the control module determines whether a WWN table entry exists for the initiator. If step 310 is false, step 322 is also performed. If step 322 is false, an entry is allocated in the control module in step 324. If step 322 is true, the initiator is serviced in step 326.

Figure 6A:
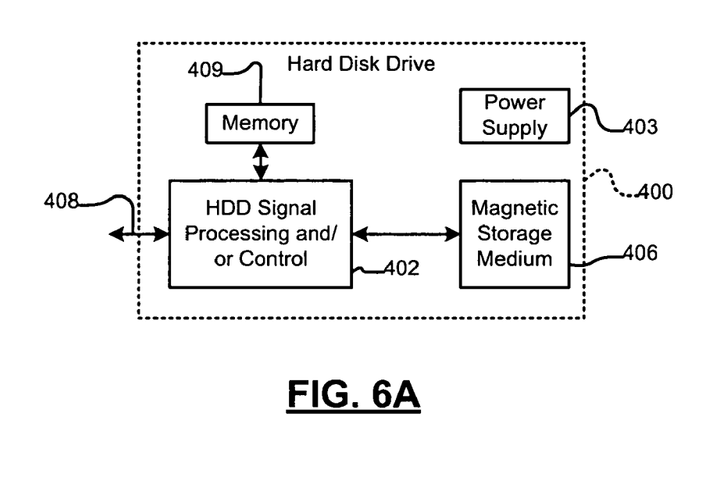
FIG. 6A is a functional block diagram of a hard disk drive.
Figure 6B:
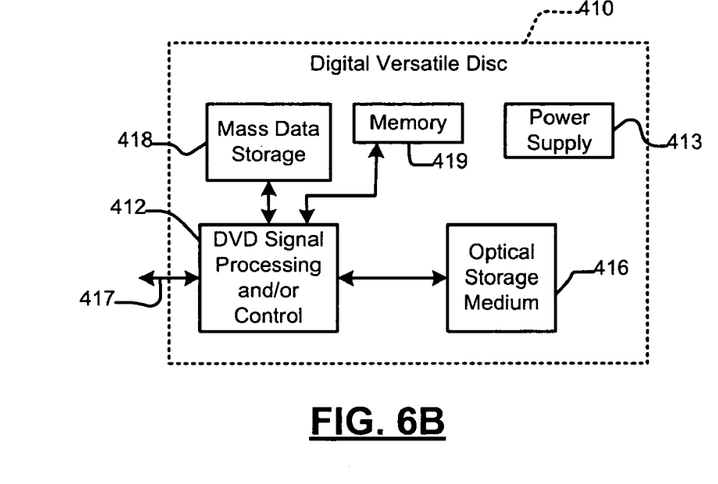
FIG. 6B is a functional block diagram of a digital versatile disk (DVD)
Figure 6C:
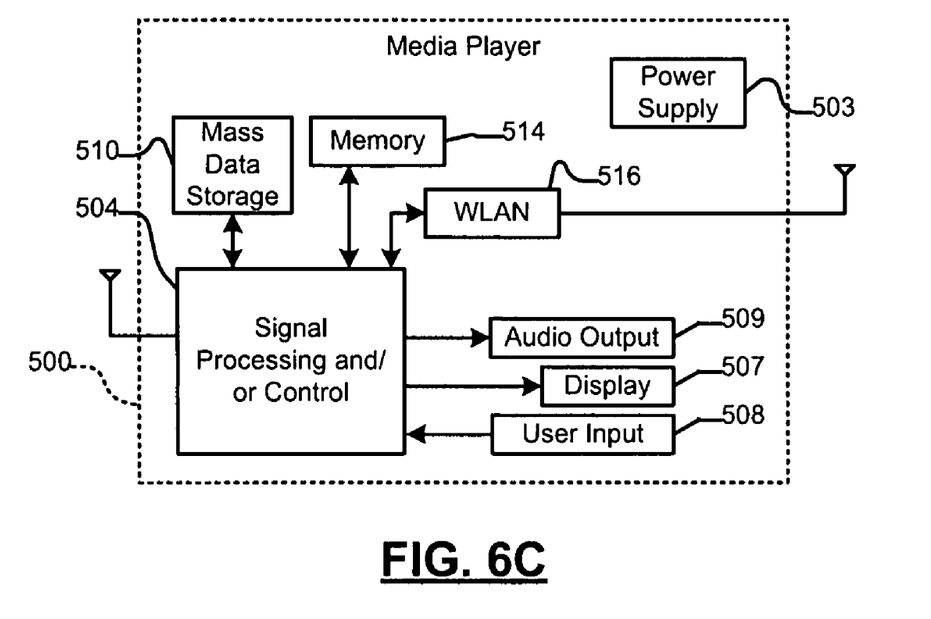
FIG. 6C is a functional block diagram of a media player.

Referring now to FIGS. 6A-6C, various exemplary implementations of the data storage controller are shown. Referring now to FIG. 6A, the data storage controller can be implemented as a hard disk drive 400. The data storage controller may implement either or both signal processing and/or control circuits and/or a power supply 403, which are generally identified in FIG. 6A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 6B, the data storage controller can be implemented in a digital versatile disc (DVD) drive 410. The data storage controller may implement either or both signal processing and/or control circuits, which are generally identified in FIG. 6B at 412, mass data storage of the DVD drive 410 and/or a power supply 413. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 6A. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Referring now to FIG. 6C, the data storage controller can be implemented in a media player 500. The data storage controller may implement and/or be implemented in either or both signal processing and/or control circuits, which are generally identified in FIG. 6C at 504, a WLAN interface, mass data storage of the media player 500 and/or a power supply 503. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A data storage controller comprising:
a link module that selectively sets an interrupt; and
a control module that is external to the link module,
wherein the control module comprises N buffers where N is an integer greater than 0,
wherein the control module allocates at least one of the N buffers to store world wide name ("WWN") table data in response to the interrupt,
wherein the control module internally manages the WWN table data, and
wherein the link module comprises a WWN line register, an initiator connection tag ("ICT") line register, and an index register that store connection request data.

2. The data storage controller of claim 1, wherein the link module sets the interrupt when the link module receives one initiator connection request while servicing another initiator connection request.

3. The data storage controller of claim 1, wherein the link module responds to changes in the index register by automatically triggering an interrupt service routine ("ISR") to configure the WWN line register and the ICT line register.

4. The data storage controller of claim 1, further comprising a buffer that stores data from the link module when the N buffers are full.

5. The data storage controller of claim 1, wherein a size of a WWN table is selectively definable so the WWN table includes one or more of the N buffers.

6. The data storage controller of claim 1, further comprising a serializer/deserializer ("SERDES") that serializes data from the link module and deserializes data from devices external to the data storage controller.

7. The data storage controller of claim 6, wherein the SERDES deserializes data from the devices external to the data storage controller uninterrupted by the interrupt.

8. A network system comprising:
the data storage controller of claim 1; and
a plurality of initiator modules that communicate with the data storage controller, wherein the plurality of initiator modules store WWN data in the N buffers.

9. The network system of claim 8, wherein the control module configures the WWN data to allow the data storage controller to initiate a connection with one of the initiators.

10. The network system of claim 8, further comprising an expander that receives signals from the plurality of initiators and transmits a signal to the data storage controller.

11. The network system of claim 8, wherein the data storage controller comprises at least one of a tape storage device, an optical storage device, a magnetic storage device, a magneto-optical storage device, and a robotic library storage device.

12. A method for storing data comprising:
selectively setting an interrupt in a link module;
allocating at least one of N buffers to store world wide name ("WWN") table data independent of the link module in response to the interrupt where N is an integer greater than 0; and
internally managing the WWN table data in the N buffers external to the link module, wherein the link module comprises a WWN line register, an initiator connection tag ("ICT") line register, and an index register that store connection request data.

13. The method for storing data of claim 12, further comprising setting the interrupt when the link module receives one initiator connection request while servicing another initiator connection request.

14. The method for storing data of claim 12, further comprising responding to changes in the index register by automatically triggering an interrupt service routine ("ISR") to configure the WWN line register and the ICT line register.

15. The method for storing data of claim 12, further comprising storing data from the link module external to the N buffers when the N buffers are full.

16. The method for storing data of claim 12, further comprising selectively defining size of a WWN table so the WWN table includes one or more of the N buffers.

17. The method for storing data of claim 12, further comprising serializing data from the link module and deserializing data from devices external to the data storage controller.

18. The method for storing data of claim 17, wherein serializing data from the devices external to the data storage controller is uninterrupted by the interrupt.

19. A data storage controller comprising:
link means for linking that selectively sets an interrupt; and
control means for controlling that is external to the link means,
wherein the control means comprises N storage means for storing data where N is an integer greater than 0,
wherein the control means allocates at least one of the N storage means to store world wide name ("WWN") table data in response to the interrupt,
wherein the control means internally manages the WWN table data, and
wherein the link means comprises a WWN line register, an initiator connection tag ("ICT") line register, and an index register that store connection request data.

20. The data storage controller of claim 19, wherein the link means sets the interrupt when the link means receives one initiator connection request while servicing another initiator connection request.

21. The data storage controller of claim 19, wherein the link means responds to changes in the index register by automatically triggering an interrupt service routine ("ISR") to configure the WWN line register and the ICT line register.

22. The data storage controller of claim 19, further comprising buffer means for storing data that stores data from the link means when the N storage means are full.

23. The data storage controller of claim 19, wherein a size of a WWN table is selectively definable so the WWN table includes one or more of the N storage means.

24. The data storage controller of claim 19, further comprising means for arranging data that serializes data from the link means and deserializes data from devices external to the data storage controller.

25. The data storage controller of claim 24, wherein the means for arranging data deserializes data from the devices external to the data storage controller uninterrupted by the interrupt.

26. A network system comprising:
the data storage controller of claim 19; and
a plurality of initiating means for initiating that communicate with the data storage controller, wherein the plurality of initiating means store WWN data in the N storage means.

27. The network system of claim 26, wherein the control means configures the WWN data to allow the data storage controller to initiate a connection with one of the initiating means.

28. The network system of claim 26, further comprising means for expanding that receives signals from the plurality of initiating means and transmits a signal to the data storage controller.

29. The network system of claim 26, wherein the data storage controller comprises at least one of means for storing tape, means for storing optical data, means for storing magnetic data, means for storing magneto-optical data, and means for robotically storing data.

* * * * *